(12) United States Patent
Menaker et al.

(10) Patent No.: US 12,293,589 B2
(45) Date of Patent: May 6, 2025

(54) SYSTEMS AND METHODS FOR DETECTING TRAFFIC OBJECTS

(71) Applicant: GM GLOBAL TECHNOLOGY OPERATIONS LLC, Detroit, MI (US)

(72) Inventors: Yonattan Menaker, Or Akiva (IL); Sharon Ayzik, Tel Aviv (IL); Ido Amit, Tel Aviv (IL); Max Fomin, Givataim (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 354 days.

(21) Appl. No.: 17/817,495

(22) Filed: Aug. 4, 2022

(65) Prior Publication Data

US 2024/0046656 A1    Feb. 8, 2024

(51) Int. Cl.
*G06V 20/58* (2022.01)
*B60W 40/105* (2012.01)
*G06V 20/56* (2022.01)

(52) U.S. Cl.
CPC .......... *G06V 20/58* (2022.01); *B60W 40/105* (2013.01); *G06V 20/588* (2022.01); *B60W 2420/403* (2013.01); *B60W 2554/4049* (2020.02)

(58) Field of Classification Search
CPC ...... G06V 20/58; G06V 20/588; G06V 20/56; B60W 40/105; B60W 2420/403; B60W 2554/4049; B60W 2520/10; B60W 2520/14; B60W 2554/20; B60W 60/001; B60W 40/00; B60W 50/00; B60W 2050/0005
See application file for complete search history.

(56) References Cited

U.S. PATENT DOCUMENTS

| | | | |
|---|---|---|---|
| 9,766,349 B1* | 9/2017 | Madhow | G01S 19/11 |
| 10,614,324 B2* | 4/2020 | Zhang | G01S 17/89 |
| 2015/0279031 A1* | 10/2015 | Cavusoglu | G06T 7/277 |
| | | | 382/103 |
| 2018/0149744 A1* | 5/2018 | Bialer | G01S 13/90 |
| 2020/0064483 A1* | 2/2020 | Li | G01S 13/867 |
| 2020/0151611 A1* | 5/2020 | McGavran | G06F 16/29 |
| 2021/0149409 A1* | 5/2021 | Honsel | G06V 20/56 |
| 2021/0341603 A1* | 11/2021 | Park | G06N 3/04 |
| 2022/0024504 A1* | 1/2022 | Batchelor | G01C 21/005 |
| 2022/0137207 A1* | 5/2022 | Song | G01S 13/931 |
| | | | 342/55 |
| 2022/0153276 A1* | 5/2022 | Steyer | G06T 7/62 |

(Continued)

FOREIGN PATENT DOCUMENTS

EP    1276649 B1 *    8/2015    ........ B60T 8/17551

*Primary Examiner* — John Villecco
*Assistant Examiner* — Kyla Guan-Ping Tiao Allen
(74) *Attorney, Agent, or Firm* — Lorenz & Kop LLP

(57) ABSTRACT

Systems and methods for controlling a vehicle. The systems and methods receive image data from at least one camera of the vehicle, detect a 2D measurement location of a static object in an image plane of the camera using the image data, receive an input vector of measurements from a sensor system of the vehicle, predict a predicted 3D location of the static object using a Unscented Kalman Filter (UKF) that incorporates a motion model for the vehicle and further using the 2D measurement location of the static object, and the input vector, and control at least one vehicle feature based on the predicted 3D location of the static object.

17 Claims, 6 Drawing Sheets

(56) References Cited

U.S. PATENT DOCUMENTS

| | | | |
|---|---|---|---|
| 2022/0204002 A1* | 6/2022 | Hosoya | G05D 1/027 |
| 2022/0261583 A1* | 8/2022 | Chen | G06V 20/56 |
| 2023/0106268 A1* | 4/2023 | Venkatesh | H04L 63/102 |
| | | | 701/23 |
| 2023/0288886 A1* | 9/2023 | Berntorp | G06N 7/01 |

* cited by examiner

SYSTEMS AND METHODS FOR DETECTING TRAFFIC OBJECTS

The present disclosure generally relates to vehicles, systems and methods for detecting static objects.

Autonomous and semi-autonomous vehicles are capable of sensing their environment and navigating based on the sensed environment. Such vehicles sense their environment using sensing devices such as radar, lidar, image sensors, and the like. The vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Some automated vehicle systems include a perception system that include capability to detect static traffic objects like Traffic Control Devices (TCDs). Determining and predicting an accurate three-dimensional location of static traffic objects improves detection of status and tracking of the static object. Furthermore, detection that is processing efficient, quickly convergent and is operable based on camera modality is desirable.

Accordingly, it is desirable to provide systems and methods that detect static traffic objects with increased computational efficiency whilst achieving positionally accurate detections. It is further desirable to perform such detections in a way that converges to a location of the static traffic object and which is operational using optical camera detections. Furthermore, other desirable features and characteristics of the present invention will become apparent from the subsequent detailed description and the appended claims, taken in conjunction with the accompanying drawings and the foregoing technical field and background.

SUMMARY

In one aspect, a method of controlling a vehicle is provided. The method comprises receiving, via at least one processor, image data from at least one camera of the vehicle, detecting, via the at least one processor, a 2D measurement location of a static object in an image plane of the camera using the image data, receiving, via the at least one processor, an input vector of measurements from a sensor system of the vehicle, predicting, via the at least one processor, a predicted 3D location of the static object using a Unscented Kalman Filter (UKF) that incorporates a motion model for the vehicle and further using the 2D measurement location of the static object, and the input vector, and controlling, via the at least one processor, at least one vehicle feature based on the predicted 3D location of the static object.

In embodiments, the UKF is initialized based on a set of sigma points that are generated using a first detection of the 2D measurement location of the static object in the image plane and a range prior.

In embodiments, the range prior includes an average range value for a first 3D location of the static object relative to the vehicle.

In embodiments, the range prior is determined based on an average range in which the static object is initially detected, an estimate of an average range of the static object based on a size of a bounding box provided from the detecting of the 2D measurement location of the static object, an association with other tracked static objects of the same kind and an area of the 2D measurement location of the static object, or a detection of the static object using 3D perception modalities.

In embodiments, comprising recursively updating the predicted 3D location of the static object using new detections of the 2D measurement location of the static object in the image plane and a prior prediction of the 3D location of the static object using the UKF.

In embodiments, the static object is a Traffic Control Device (TCD).

In embodiments, the predicting the 3D location of the static object using the UKF includes a prediction step and an update step, wherein the prediction step performs the following: constructing a prediction sigma point matrix, propagating the prediction sigma point matrix through the motion model to obtain propagated sigma points, determining an estimated 3D location of the static object using the propagated sigma points, estimating a propagated estimation error covariance using the propagated sigma point, and wherein the update step performs the following: constructing an update sigma point matrix using the estimated 3D location of the static object and the propagated estimation error covariance, propagating the update sigma point matrix through a measurement model to obtain a measurement sigma point matrix representing predicted 2D measurement locations of the static object in the image plane of the camera, determining an updated 3D location of the static object using a disparity between the measurement sigma point matrix and the 2D measurement location of the static object in the image plane of the camera.

In embodiments, assigning a lane to the TCD and controlling the at least one vehicle feature is responsive to a state of the TCD when the TCD is assigned to a same lane as that of the vehicle.

In embodiments, the input vector includes a value of angular velocity of the vehicle and a value of linear velocity of the vehicle.

In embodiments, the UKF uses the motion model and a measurement model to predict a predicted 2D location of the static object in the image plane and predicts the predicted 3D location of the static object based on a disparity between the predicted 2D location of the static object and the measurement 2D location of the static object.

In another aspect, a system for controlling a vehicle. The system includes at least one camera, a sensor system, at least one processor in operable communication with the sensor system and the at least one camera, wherein the at least one processor is configured to execute program instructions, wherein the program instructions are configured to cause the at least one processor to: receive image data from the at least one camera of the vehicle, detect a 2D measurement location of a static object in an image plane of the camera using the image data, receive an input vector of measurements from a sensor system of the vehicle, predict a predicted 3D location of the static object using a Unscented Kalman Filter (UKF) that incorporates a motion model for the vehicle and further using the 2D measurement location of the static object, and the input vector, and control at least one vehicle feature based on the predicted 3D location of the static object.

In embodiments, the program instructions are configured to cause the at least one processor to: initialize the UKF based on a set of sigma points that are generated using a first detection of the 2D measurement location of the static object in the image plane and a range prior.

In embodiments, the range prior includes an average range value for a first 3D location of the static object relative to the vehicle.

In embodiments, the range prior is determined based on an average range in which the static object is initially detected, an estimate of an average range of the static object based on a size of a bounding box provided from the detecting of the 2D measurement location of the static object, an association with other tracked static objects of the same kind and an area of the 2D measurement location of the static object, or a detection of the static object using 3D perception modalities.

In embodiments, the program instructions are configured to cause the at least one processor to recursively update the predicted 3D location of the static object using new detections of the 2D measurement location of the static object in the image plane and a prior prediction of the 3D location of the static object using the UKF.

In embodiments, the static object is a Traffic Control Device (TCD).

In embodiments, the program instructions are configured to cause the at least one processor to predict the 3D location of the static object using the UKF using a prediction step and an update step, wherein the prediction step performs the following: constructing a prediction sigma point matrix, propagating the prediction sigma point matrix through the motion model to obtain propagated sigma points, determining an estimated 3D location of the static object using the propagated sigma points, estimating a propagated estimation error covariance using the propagated sigma point, and wherein the update step performs the following: constructing an update sigma point matrix using the estimated 3D location of the static object and the propagated estimation error covariance, propagating the update sigma point matrix through a measurement model to obtain a measurement sigma point matrix representing predicted 2D measurement locations of the static object in the image plane of the camera, and determining an updated 3D location of the static object using a disparity between the measurement sigma point matrix and the 2D measurement location of the static object in the image plane of the camera.

In embodiments, the program instructions are configured to cause the at least one processor to assign a lane to the TCD, wherein controlling the at least one vehicle feature is responsive to a state of the TCD when the TCD is assigned to a same lane as that of the vehicle.

In another aspect, a vehicle is provided. The vehicle includes at least one camera, a sensor system, at least one processor in operable communication with the sensor system and the at least one camera, wherein the at least one processor is configured to execute program instructions, wherein the program instructions are configured to cause the at least one processor to: receive image data from the at least one camera of the vehicle, detect a 2D measurement location of a static object in an image plane of the camera using the image data, receive an input vector of measurements from a sensor system of the vehicle, predict a predicted 3D location of the static object using a Unscented Kalman Filter (UKF) that incorporates a motion model for the vehicle and further using the 2D measurement location of the static object, and the input vector; and control at least one vehicle feature based on the predicted 3D location of the static object.

In embodiments, the program instructions are configured to cause the at least one processor to: initialize the UKF based on a set of sigma points that are generated using a first detection of the 2D measurement location of the static object in the image plane and a range prior.

In embodiments, the range prior includes an average range value for a first 3D location of the static object relative to the vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
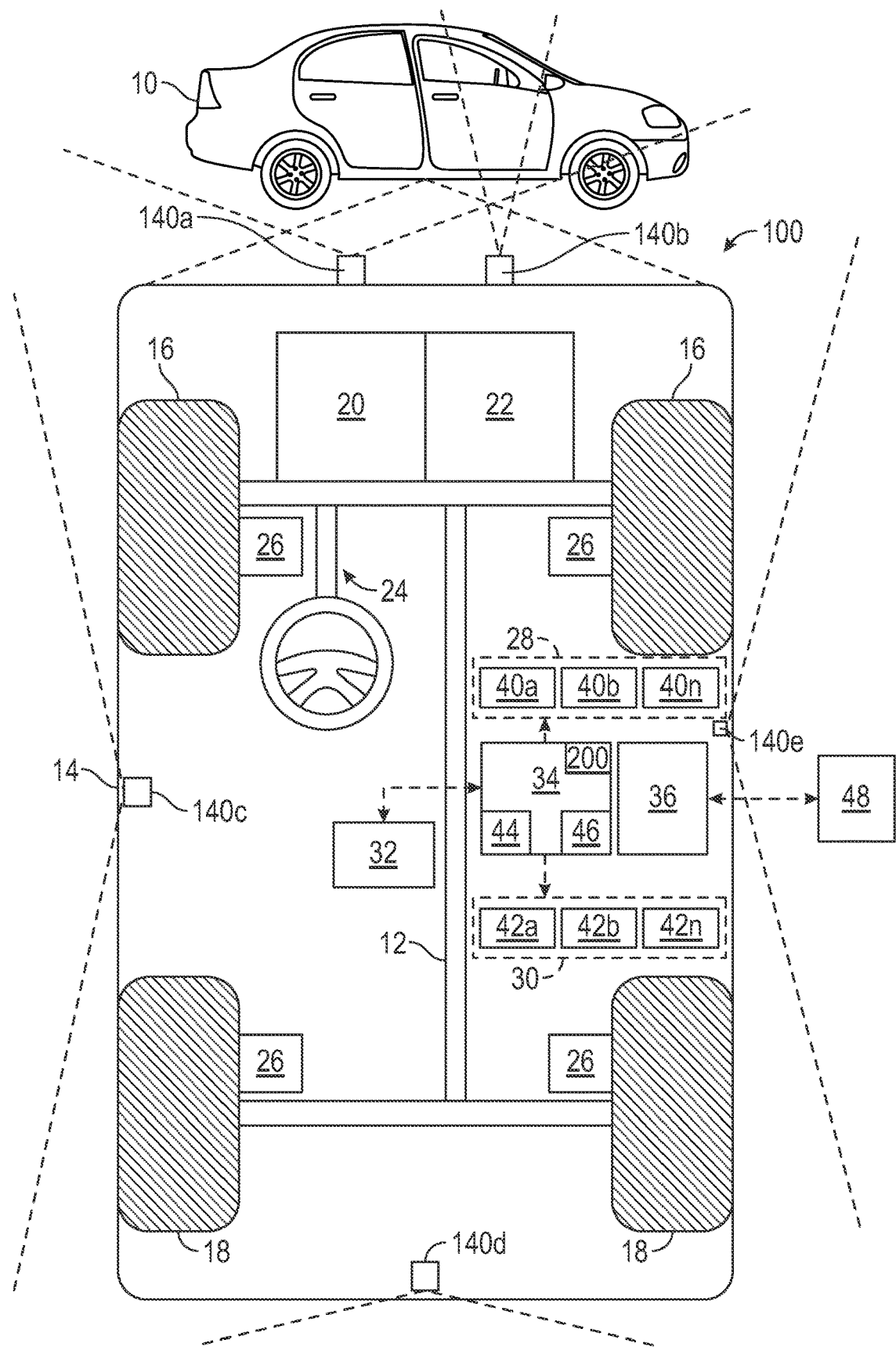
FIG. 1 is a functional block diagram illustrating an autonomous or semi-autonomous vehicle system utilizing a static object detection system, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Systems and methods described herein provide a robust 3D position estimation of static objects using noisy 2D observations taken from a vehicle with bounded motion uncertainty. The proposed systems and methods estimate the 3D position of a static object using an Unscented Kalman Filter (UKF), fusing measurements from multiple sensors over time. Noisy camera detections in pixel coordinates are fused over time along with noisy platform motion measurements to produce a 3D estimate of the static object location. Treating both measurements and object state as spatial Gaussian distributions in 2D and 3D allows a robust estimate of object location while explicitly accounting for measurement noise. Prior knowledge and sparse range measurements (from Lidar or Radar) can also be incorporated into the UKF framework but are not required.

Systems and methods described herein provide efficient single 3D point estimation using UKF from 2D observations and optionally also 3D observations. A mathematical formulation supports multi sensor fusion from multiple cameras and other sensing modalities (radar/lidar). The algorithmic processes explicitly consider noise in both object measurements and ego platform motion measurement inputs. The present disclosure enhances measurement associations that rigorously accounts for uncertainties in both target parameters and observations. The systems and methods provide uncertainty bounds for estimated target parameters.

With reference to FIG. 1, a vehicle system shown generally at 100 is associated with a vehicle 10 in accordance with various embodiments. In general, the vehicle system 100 includes a static object detection system 200 that is configured to predict a location of a static traffic object using an Unscented Kalman Filter 202 (FIG. 3) that recursively predicts a location of the static traffic object in 3D coordinates relative to the vehicle based on a disparity between an estimate of a location of the static traffic object in 2D coordinates of a camera image plane provided by a measurement model of the UKF and a measured/detected location of the static traffic object in the camera image plane.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In some embodiments, the vehicle 10 is an autonomous vehicle and the static object detection system 200 is incorporated into the autonomous vehicle 10 (hereinafter referred to as the autonomous vehicle 10). The present description concentrates on an exemplary application in autonomous vehicle applications. It should be understood, however, that the static object detection system 200 described herein is envisaged to be used in semi-autonomous automotive vehicles.

The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras 140a-140n, thermal cameras, ultrasonic sensors, and/or other sensors. The optical cameras 140a-140n are mounted on the vehicle 10 and are arranged for capturing images (e.g. a sequence of images in the form of a video) of an environment surrounding the vehicle 10. In the illustrated embodiment, there are two front cameras 140a, 140b arranged for respectively imaging a wide angle, near field of view and a narrow angle, far field of view. Further illustrated are left-side and right-side cameras 140c, 140e and a rear camera 140d. The number and position of the various cameras 140a-140n is merely exemplary and other arrangements are contemplated.

The sensor system 28 includes one or more of the following sensors that provide an input vector 204 (FIG. 3) of measurement data used by a motion model 206 incorporated in the UKF 202. The sensor system 28 may include a steering angle sensor (SAS), a wheel speed sensor (WSS), an inertial measurement unit (IMU), a global positioning system (GPS), an engine sensor, and a throttle and/or brake sensor. The sensor system 28 provides a measurement of translational speed and angular velocity in the input vector 204.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the static object detection system 200 and, when executed by the processor 44, are configured to implement the methods and systems described herein for detecting a 3D location of a static traffic object using 2D detection of the static traffic object as an input to the UKF 202.

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

As can be appreciated, the subject matter disclosed herein provides certain enhanced features and functionality to what may be considered as a standard or baseline autonomous vehicle 10. To this end, an autonomous vehicle can be modified, enhanced, or otherwise supplemented to provide the additional features described in more detail below. The subject matter described herein concerning the static object detection system 200 is not just applicable to autonomous driving applications, but also other driving systems having one or more automated features utilizing automatic traffic object detection, particularly the location of static traffic objects to control an automated feature of the vehicle 10.

Figure 2:
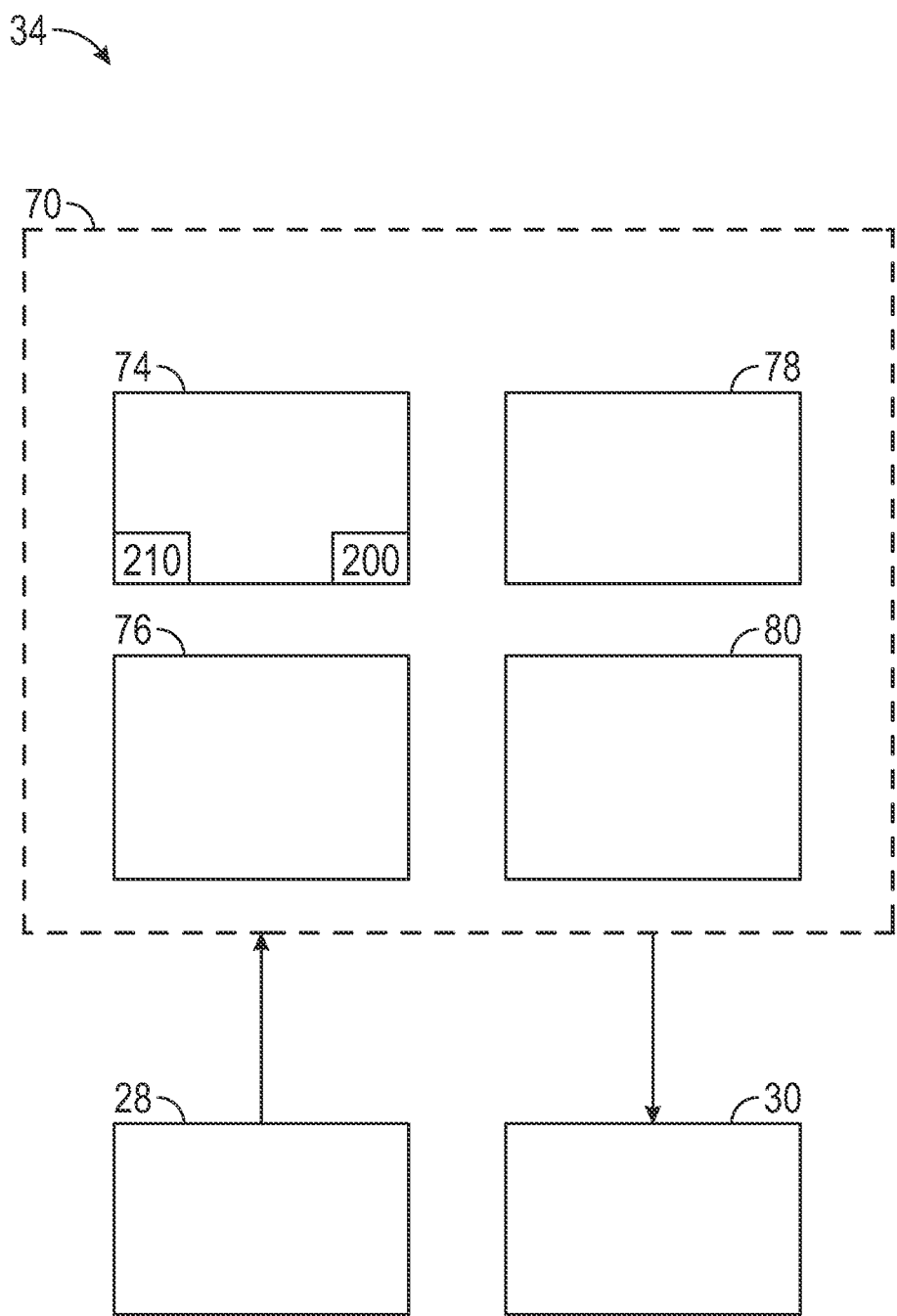
FIG. 2 is a dataflow diagram illustrating an autonomous driving system that includes the static object detection system, in accordance with various embodiments.

In accordance with an exemplary autonomous driving application, the controller 34 implements an autonomous driving system (ADS) 70 as shown in FIG. 2. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 2, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors. The computer vision system 74 includes an object detection module 210 (FIG. 3) and the static object detection system 200.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path. The positioning system 76 may process a variety of types of localization data in determining a location of the vehicle 10 including Inertial Measurement Unit data, Global Positioning System (GPS) data, Real-Time Kinematic (RTK) correction data, cellular and other wireless data (e.g. 4G, 5G, V2X, etc.), etc.

Figure 3:
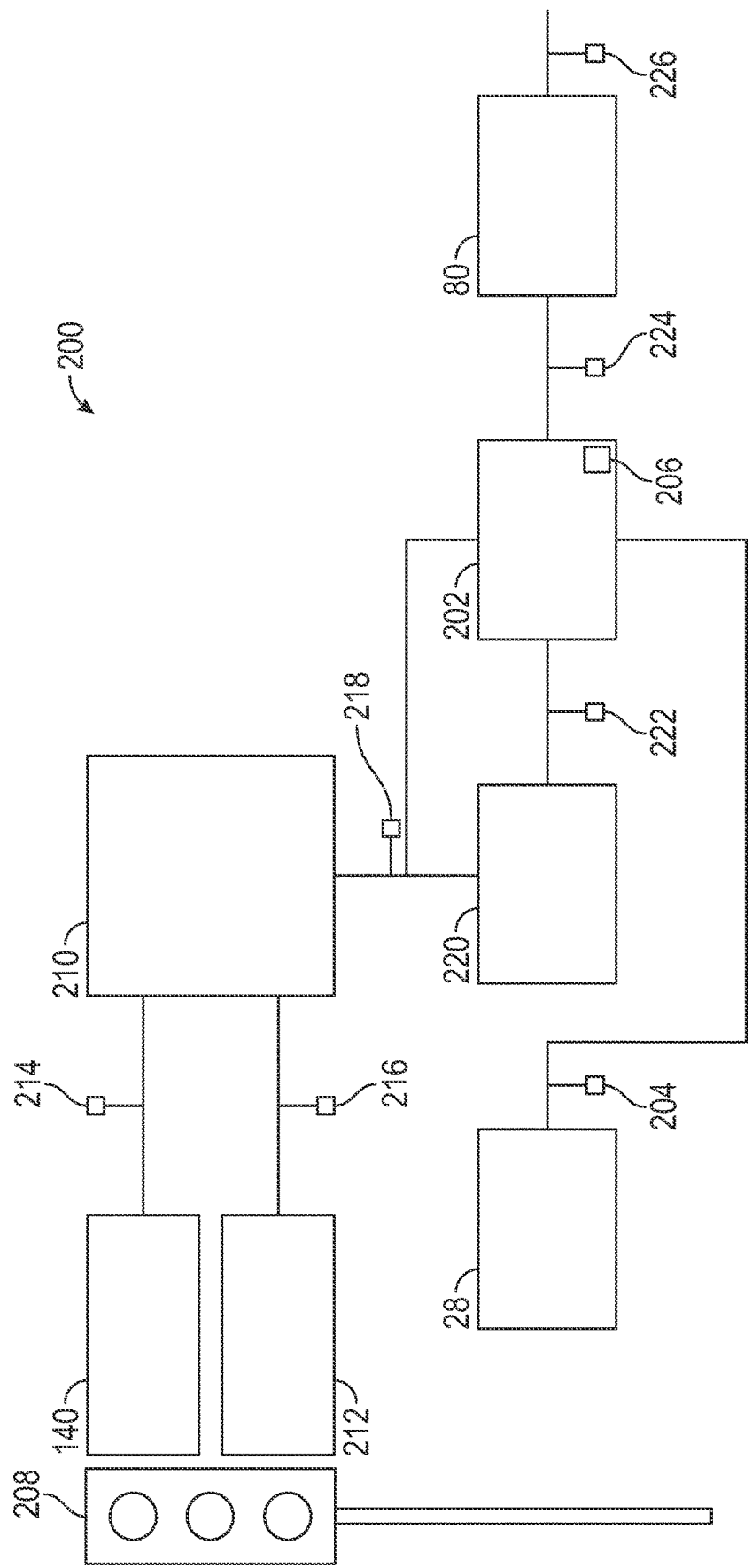
FIG. 3 is a system diagram illustrating functional blocks the static object detection system including an Unscented Kalman Filter (UKF) and an initialization module, in accordance with various embodiments.

In various embodiments, the controller 34 implements machine learning techniques to assist the functionality of the controller 34, such as feature detection/classification, obstruction mitigation, route traversal, mapping, sensor integration, ground-truth determination, and the like. One such machine learning technique performs traffic object detection whereby traffic objects are identified, localized and optionally the status is determined for further processing by the guidance system 78. The machine learning technique may be implemented by a DCNN. For example, a TCD 208 (FIG. 3), e.g. a traffic light, may be identified and localized and the light status determined. The feature detection and classification in two-dimensions (2D) may be performed by the object detection module 210 (FIG. 3). A 3D location of static features may be inferred by the UKF 202 from the 2D location detection and classification provided by the object detection module 210. Depending on the state of the traffic light (e.g. red for stop or green for go), the guidance system 78 and the vehicle control system 80 operate together to determine whether to stop or go at the traffic lights. The 3D location of the TCD and other static traffic objects support localization of the vehicle 10 by the positioning system 76 such as lane alignment of the vehicle 10 and the TCD 208.

As mentioned briefly above, the static object detection system 200 of FIG. 1 (and FIGS. 2 and 3) is included within the ADS 70 in autonomous driving applications, for example in operable communication with the computer vision system 74, the positioning system 76, the guidance system 78 and the vehicle control system 80. The static object detection system 200 is configured to predict a 3D location of static traffic objects and the vehicle control system 80 is responsive thereto to generate an automated control command. The vehicle control system 80 works with the actuator system 30 to traverse such a trajectory.

Referring to FIG. 3, with continued reference to FIGS. 1 and 2, the static object detection system 200 is further illustrated in accordance with exemplary embodiments. The static object detection system 200 includes functional modules that are performed by the programming instructions described hereinbefore. The static object detection system 200 includes a camera 140 or a plurality of such cameras 140, one or more other perception modalities 212 (e.g. RADAR, LiDAR and/or Ultrasound), the object detection module 210, an initialization module 220 and the UKF 202. The camera 140 provides frames of image data 214, which is 2D, and includes an image of a static traffic object such as the TCD 208. The object detection module 210 processes the image data 214 to detect and classify objects in the image data 214.

The object detection module 210 may include a convolutional neural network (or other kind of machine learning algorithm) that predicts bounding boxes and class probabilities for the bounding boxes. The machine learning algorithm may be trained on labelled images. The bounding boxes represent size and location of the objects found in each image of the image data 214. The object detection module 210 may also output a variance (or spatial confidence score) for each bounding box reflecting how spatially accurate the prediction for the bounding box is determined to be. Each bounding box includes five predictions in one embodiment: u, v, w, h, and confidence/variance. The (u, v) coordinates represent the center of the box relative to the bounds of the grid cell. The width and height are predicted relative to the whole image. The bounding box is also associated with a conditional class probability. The object detection module 210 provides a 2D location measurement 218 (u, v) for each bounding box that is classified as a static traffic object. That is, the classification can be analyzed as to static or moving, e.g. by cross-referencing with a predetermined list of targets that are workable with the further processing of the static object detection system 200 and the 2D location measurement 218 output for those classified objects verified as static objects in the list. In the following exemplary embodiment, a detection of a single TCD 208 is assumed. However, other static traffic objects like roads signs may be detected and more than one detection may be processed. The static traffic object may be a symmetrical object around a center at the 2D location (u,v) such as a circle of a traffic light bulb. The 2D location measurement may represent a 2D pixel location in the image plane of the camera 140.

In the exemplary embodiment, the 2D location measurement 218 is provided to the initialization module 220 and to the UKF 202. The UKF 202 receives the 2D location measurement and the input vector from the sensor system 28. The input vector 204 includes measurements of motion parameters (e.g. translational speed and angular velocity) of the vehicle 10 that are used by the motion model 206 included in the UKF 202. The UKF 202 includes prediction and update stages. In the prediction stage, a set of sigma points are constructed that are deterministically chosen sample points that capture the prior state and its covariance. The state in this case is a 3D location of the static traffic object. The sigma points are propagated through the motion model 206 to produce a predicted set of sigma points transformed by an unscented transformation defined by the motion model 206 instilled with the input vector 204 from the sensor system 28. The predicted set of sigma points are recombined to provide a predicted state and associated covariance. In the update stage, the UKF 202 constructs another set of sigma points from the predicted state and covariance that are propagated through a measurement model 418 (FIG. 4) that relates 2D location of the static traffic object to 3D location of the static traffic object to produce a predicted 2D state measurement set of sigma points that are recombined to produce a predicted 2D state measurement and associated covariance. An updated 3D state is produced based on a disparity between the predicted 2D state measurement and the 2D location measurement 218. An updated covariance is also calculated. The updated state and associated covariance are fed back to the start of the prediction stage of the UKF 202 so that recursive prediction and update is performed based on new (most recent) input vector 204 and 2D location measurement 218 in order to converge on an accurate 3D location of the static traffic object. The updated state corresponds to a predicted 3D location 224. The UKF 202 will be further described with reference to FIG. 4.

The predicted 3D location 224 is provided to the vehicle control system 80 to control one or more automated vehicle features that use 3D location of a static traffic object as an input. For example, lane alignment with a TCD 208 relies upon knowing a 3D location of the TCD 208. Further, tracking of static traffic object, which is useful for path planning, is aided by 3D location information. The 3D location information can also support more efficient location of the static traffic object in the image data 214 by the object detection module 210.

In order to commence the recurring process of the UKF 202, the UKF 202 is initialized with a reasonable state estimate for an initial static traffic object detection. To do so, the 2D location measurement 218 for an initial detection is augmented with range information. In this way, a new 3D target is initialized from a new 2D detection by the object detection module 210. To accomplish this, a prior on the range of the static traffic object is obtained from one or more of the following sources:
  (i) An average range in which a static traffic object is initially detected by the object detection module 210 with a relatively large (e.g. 50 m) variance;
  (ii) A size of the bounding box in 2D and known information on the size of the traffic object of the given classification coupled with the box dimension estimation error, which allows a range to be estimated;
  (iii) An association to tracked traffic objects in the area of the detection, where the tracked traffic objects are associated with range information and the neighboring new traffic object in the detection is assumed to be at a similar range; and
  (iv) Range information that is available from perception data 216 (which is 3D perception data) that is provided by other perception modalities 212 when the traffic object is detected, and associated, in both the perception data 216 and the image data 214.

The 2D location measurement 218 is augmented with the range information for the new detection of a static traffic object and this information is converted into 3D location estimation and covariance, which can be converted into initial sigma points for the initialization of the UKF 202, as will be described further below with respect to FIG. 4.

Figure 4:
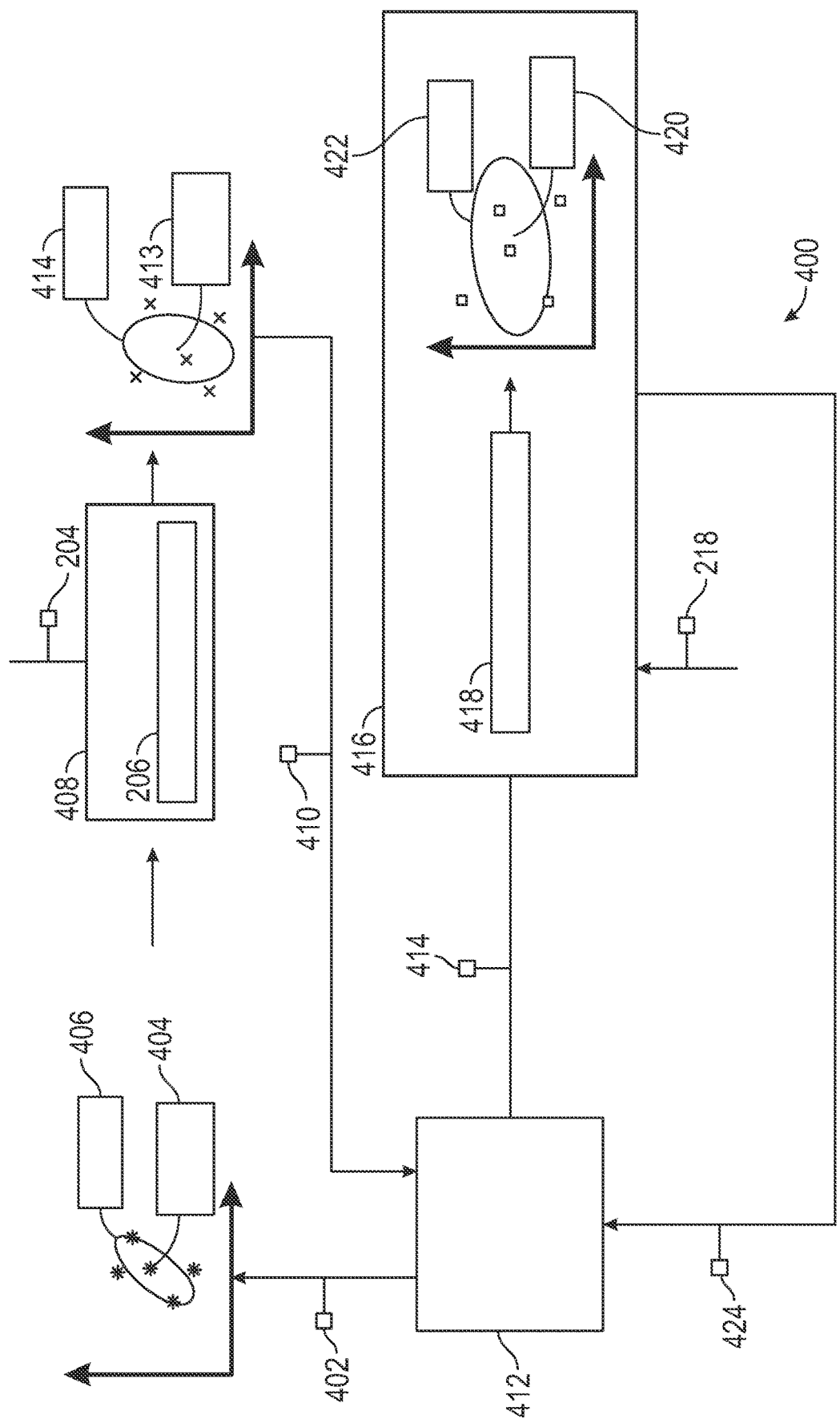
FIG. 4 is a data flow diagram schematically representing a process of the UKF of FIG. 3, in accordance with various embodiments.

Referring to FIG. 4, algorithmic processes 400 of the UKF 202 will be described in further detail in accordance with an exemplary embodiment. The algorithmic process 400 is implemented by modules including a prediction sub-module 408, an update sub-module 416 and a first sigma point construction sub-module 412. The prediction sub-module 408 includes the motion model 206. The motion model 206 can be described by the function:

$$x_k = f(x_{k-1}, u_{k-1}, w_{k-1}) \tag{1}$$

$x_k$ represents the state at current time k. The state of the motion model is a 3D location of the static traffic object in 3D cartesian ego coordinates of the vehicle 10. $x_{k-1}$ represents the state at a prior time step, $u_{k-1}$ represents the input vector 204 at the prior time step and w represents process noise at the prior time step. The state x, input u and process noise w have a distribution N as follows:

$$x \sim N(\bar{x}, P), u \sim N(\bar{u}, U), w \sim N(0, Q) \tag{2}$$

The process noise w is zero mean Gaussian noise with variance Q. P and U also represent variance. An exemplary motion model may be in the form:

$$x_{k+1}^{ego} = R_k(\dot{\omega}_k) x_k^{ego} - \dot{t}_k \Delta t \tag{3}$$

In equation 3, $\dot{\omega}_k$ represents angular velocity of the vehicle 10 and $\dot{t}_k$ represents translational speed of the vehicle 10. The input vector 204 provides values for the angular velocity and translation speed of the vehicle 10.

Continuing to refer to FIG. 4, the first sigma point construction sub-module 412 generates prior sigma points 402 that are sent to the prediction sub-module 408 to propagate through the motion model 206. For an initial detection, the prior sigma points are generated based on an initialization 3D location of the static traffic object and an associated initialization variance according to an initialization process that has been described above and which will be further described with reference to FIG. 5. For subsequent detections, the prior sigma points 402 are generated based on the state and covariance predictions from a most recent iteration through the predication and update stages that are performed by the prediction sub-module 408 and the update sub-module 416, respectively. The prior sigma points 402 are constructed by the first sigma point construction sub-module 412 according to the following equations:

$$x^a = \begin{bmatrix} x \\ w \\ u \end{bmatrix} \sim N\left(\hat{x}^a = \begin{bmatrix} \hat{x} \\ 0 \\ \hat{u} \end{bmatrix}, P^a = \text{diag}([P \ Q \ U])\right) \tag{4}$$

$$X_{K-1}^a = [\hat{x}_{k-1}^a \hat{x}_{k-1}^a + \gamma\sqrt{P_{k-1}^a} \ \hat{x}_{k-1}^a - \gamma\sqrt{P_{k-1}^a}] \tag{5}$$

Equation 5 represents an augmented sigma point matrix, which is embodied in the prior sigma points 402 in FIG. 4. The augmented sigma point matrix is propagated through the motion model 206 according to the following equation:

$$X_{k|k-1} = f(X_{k-1}^a) \tag{6}$$

in order to predict the state:

$$\hat{x}_{k|k-1} = \sum_{i=0}^{2L} w_i^{(m)} X_{i, K|k-1} \tag{7}$$

and the associated estimated error covariance:

$$P_{k|k-1} = \sum_{i=0}^{2L} (w_i^{(c)} (X_{i,k|k-1} - \hat{x}_{k|k-1})(X_{i,k|k-1} - \hat{x}_{k|k-1})^T) \tag{8}$$

In combination, and with reference to FIG. 4, equations (7) and (8), provide the predicted 3D state 413 and the predicted covariance 414, respectively, that together form the predicated 3D state and predicted covariance 410 output from the prediction sub-module 408. Equations (6) and (7) make a prediction on the 3D location of the static traffic object based on the input vector 204 populating the motion model 206 and an estimate of the evolution of the 3D location of static traffic object at the next time step when the motion of the vehicle 10 relative to the static traffic object is estimated using the motion model 206.

In some embodiments, the first sigma point construction sub-module 412 receives the predicted 3D state and predicted covariance 410 and generates a set of sigma points using the predicted state and covariance. In one embodiment, a measurement sigma point matrix is generated according to the following equation:

$$X = [\hat{x}_{k+1|k} \hat{x}_{k+1|k} + \gamma\sqrt{P_{k+1|k}} \hat{x}_{k+1|k} - \gamma\sqrt{P_{k+1|k}}] \tag{9}$$

The measurement sigma points are propagated through the measurement model 418. The measurement model 418 relates 2D location of the static object in the image plane (Z—image coordinates) and the 3D location of the static object (X) relative to the vehicle 10 according to a function h:

$$Z = h(X) \tag{10}$$

The update sub-module 416 predicts measurement statistics and a Kalman gain (K) according to the following equations:

$$\hat{z} = \sum_{i=0}^{2L} w_i^m z_i; Z = \{z_i\} \tag{11}$$

$$S = \sum_{i=0}^{2L} w_i^c (z_i - \hat{z})^T + R \tag{12}$$

$$P_{xz} = \sum_{i=0}^{2L} w_i^c (x_i - \hat{x}_{k+1|k})(z_i - \hat{z})^T \tag{13}$$

$$K = P_{xz} S^{-1} \tag{14}$$

Equation 11 represents a weighted combination of the measurement sigma points, which corresponds to the predicted 2D state measurement 420 in FIG. 4. Equation 12 represents a covariance of the measurement sigma points (which have been propagated through the measurement model 418) and correspond to the measurement covariance 422 in FIG. 4. Equation 13 represents a cross-correlation of the difference between the 3D state and 2D sigma points. Equation 14 represent the Kalman gain. Using the above calculated values, the update sub-module 416, determines the updated state and covariance as follows:

$$\hat{x}_{k+1|k+1} = x_{k+1|k} + K(z - \hat{z}) \quad (15)$$

$$P_{k+1|k+1} = P_{k+1|k} - KSK^T \quad (16)$$

Equations 15 and 16 provide a prediction of the state and covariance in the next time step. The predicted state and covariance so calculated are output by the update sub-module 416 as the updated 3D state and updated covariance 424. Equation 15 represents the 3D state of the current prediction adjusted based on a disparity between the 2D state measurement 218 (z) from the object detection module 310 and the predicted 2D state measurement 420. The Kalman gain K represents a reliability of the predication relative to the measurement. The updated 3D state and updated covariance 424 are sent to the first sigma point construction sub-module 412 for conversion to a set of sigma points as the prior sigma points 402 for further iterations of the UKF algorithmic processes 400.

Figure 5:
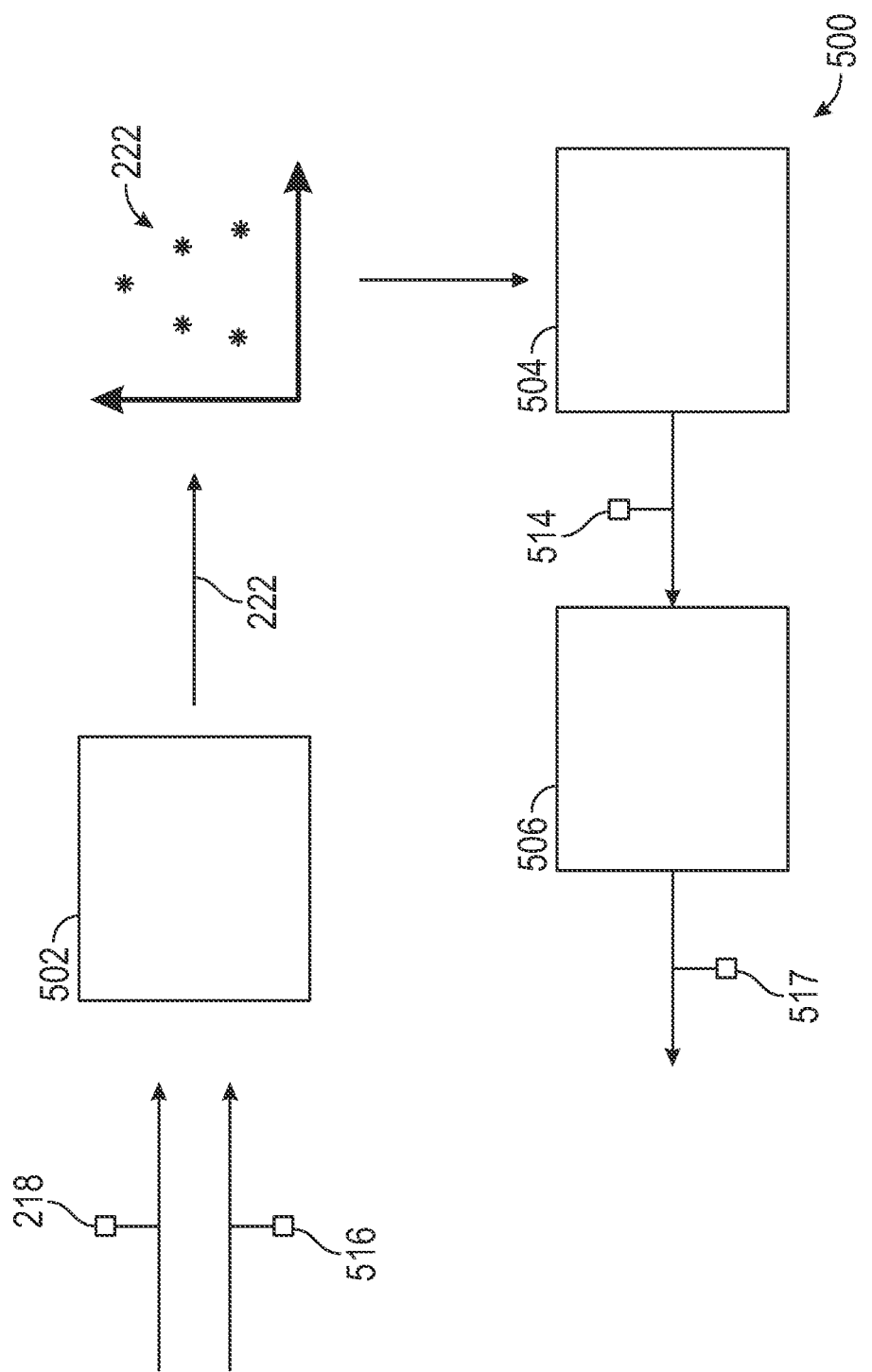
FIG. 5 is a data flow diagram schematically representing a process of the initialization module, in accordance with various embodiments.

Referring to FIG. 5, an exemplary initialization process 500 carried out by the initialization module 220 is shown. As discussed heretofore, the initialization process 500 combines the 2D location measurement 218 with a range prior 516. The 2D location measurement is for a first detection by the object detection module 310 of a static traffic object. The combined information is received by the second sigma point construction sub-module 502, which generates a set of initial sigma points 222. Assuming the range prior 516 is provided as a mean $\hat{r}$ and variance $\sigma_r^2$, the initialization process 500 uses sigma point approximation to propagate the detection vector (including the 2D location measurement 218 and the range prior 516) to 3D space. The second sigma point construction sub-module 502 generates the initial sigma points 222 (Z) from the detection vector as follows:

$$Z = [z_\alpha z_\alpha + \gamma\sqrt{R} z_\alpha - \gamma\sqrt{R}] = \{z_i\} \quad (17)$$

where $z_\alpha$ is the detection vector $z_\alpha = [u \ v \ r]$ and $R = \text{diag}([\sigma_u^2 \ \sigma_v^2 \ \sigma_r^2])$.

The set $Z = \{z_i\}$ is propagated through the following equations by the transformation sub-module 504 to obtain transformed sigma points 514 representing a 3D location of the set Z in camera coordinates.

$$\begin{bmatrix} x_i^{cam} \\ y_i^{cam} \\ z_i^{cam} \end{bmatrix} = r_i K^{-1} \begin{bmatrix} u_i \\ v_i \\ 1 \end{bmatrix} \quad (18)$$

$$\begin{bmatrix} x_i \\ 1 \end{bmatrix} = \begin{bmatrix} x_i^{ego} \\ y_i^{ego} \\ z_i^{ego} \\ 1 \end{bmatrix} = (M_{ego}^{camera})^{-1} \begin{bmatrix} x_i^{cam} \\ y_i^{cam} \\ z_i^{cam} \\ 1 \end{bmatrix} \quad (19)$$

where K is the intrinsic parameter matrix of the pinhole camera:

$$K = \begin{bmatrix} f_x & & c_x \\ & f_y & c_y \\ & & 1 \end{bmatrix} \quad (20)$$

and $M_{ego}^{camera}$ is the homogenous transformation matrix that transforms from ego to camera coordinates:

$$M_{ego}^{camera} = \begin{bmatrix} R_{ego}^{camera} & t_{ego}^{camera} \\ & 1 \end{bmatrix} \quad (21)$$

The transformed sigma points 514 generated by the transformation sub-module 504 are provided to the initialization state and covariance calculation sub-module 506. The initialization state and covariance calculation sub-module 506 provides an estimate of the propagated mean and covariance and outputs initialization 3D state and initialization covariance 517, which can be used by the first sigma point construction sub-module 412 to generate the prior sigma points 402 in FIG. 4 to commence the UKF algorithmic process 400. The initialization 3D state and initialization covariance 517 are determined as follows:

$$\hat{x} \Sigma_{i=0}^{2L} w_i^m x_i; X = \{x_i\} \quad (22)$$

$$P = \Sigma_{i=0}^{2L} w_i^c (x_i - \hat{x})(x_i - \hat{x})^T \quad (23)$$

where L is the dimension of $\hat{x}$, $\gamma = \sqrt{L + \lambda}$ and $\lambda = \alpha^2(L+k) - L$. The $\alpha$ parameter determines the spread of the initialization sigma points around $\hat{x}$ and is usually set to a small positive value. k is usually set to 0. $w_i^m$ and $w_i^c$ represent summation weights. Equation 22 combines the transformed sigma points to provide a mean 3D location of the static traffic object and equation 23 provides a measure of the distribution variance of the transformed sigma points around the mean.

Figure 6:
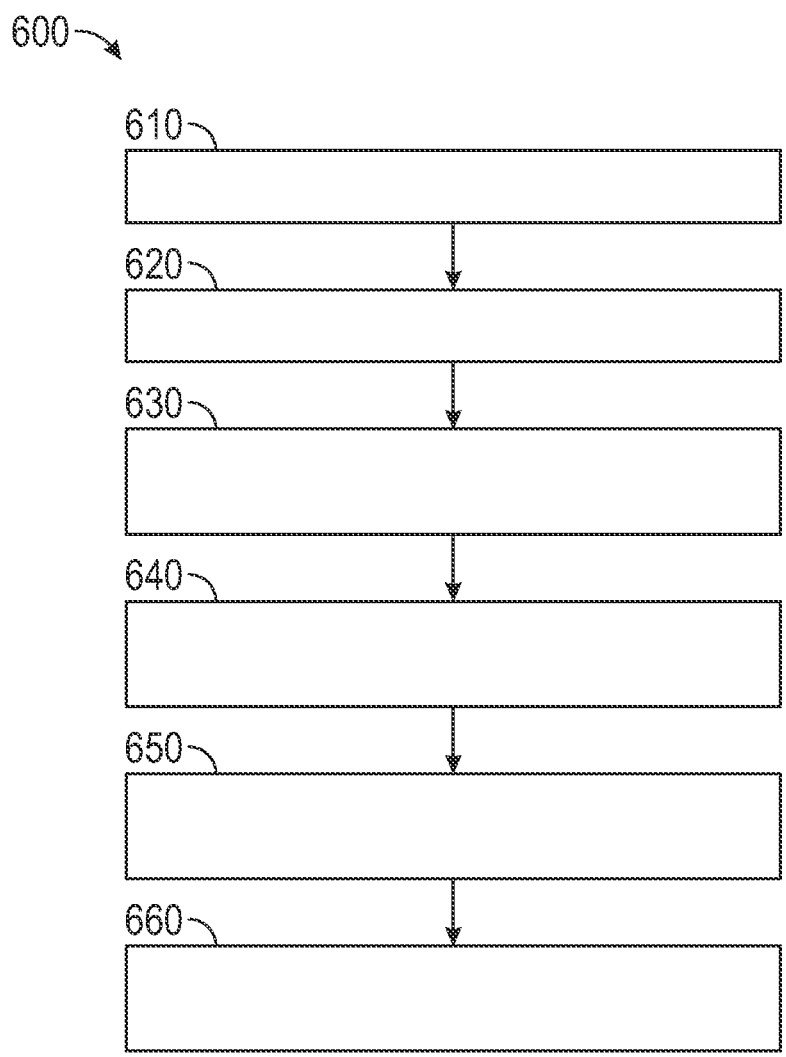
FIG. 6 is a flowchart illustrating method steps of an algorithmic process to detect static objects, in accordance with various embodiments.

Referring now to FIG. 6, and with continued reference to FIGS. 1-5, a flowchart illustrates a method of static traffic object detection 600 that can be performed by the static object detection system of FIG. 3 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. In various embodiments, the method 600 can be scheduled to run based on one or more predetermined events, and/or can run continuously during operation of the autonomous vehicle 10. The predetermined event may be a first detection of a static object by the object detection module 310.

At 610, a static traffic object is detected by the object detection module 310. The object detection module 310 may use a trained neural network to classify and locate features in provided image data 214 and to output the classification and the 2D location measurement 218. The UKF 202 is provided at least one 2D location measurement for an object that is classified as being a static traffic object such as a TCD 208. At 620, if the static traffic object of step 610 is an initial detection (e.g. a previously unassociated/not tracked traffic object), the UKF 202 is initialized. The UKF is initialized by combining the 2D location measurement 218 with a range prior and producing a set of initialization sigma points based thereon. The set of initial sigma points 222 is transformed through a camera model into 3D space. The transformed sigma points are recombined to provide an initialization 3D state (location) for the static traffic object and an initialization covariance.

In step 630, the 2D location measurement 218 and the input vector 204 is received by the UKF 202. In a prediction stage (step 640), prior sigma points 402 are constructed using either a predicted 3D state and associated covariance from a prior iteration of the UKF or using the initialization 3D state and associated covariance from step 620. The prior sigma points 402 are propagated through the motion model 206, which is populated by the input vector 204 to produce the predicted 3D state and predicted covariance 410. In an update stage (step 650), update sigma points and covariance are constructed based on the predicted 3D state and predicted covariance 410, which are propagated through the measurement model 418 to provide a predicted 2D state measurement 420 and measurement covariance 422. A disparity between the 2D location measurement 218 and the predicted 2D state measurement is used to update the 3D state prediction such that an updated 3D state and updated covariance 424 is provided, which can be used as a basis for further iterations of the UKF 202. The UKF 202 outputs the predicted 3D location 224, which has been converged to by iterations of the UKF 202. The predicted 3D location 224 is used to control an automated vehicle feature in step 660. The vehicle feature may be steering, propulsion and/or braking. That is, a path of the vehicle 10 may be determined using the predicted 3D location of the static traffic object as a reference location to guide motion control of the vehicle 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of controlling a vehicle, the method comprising:
   receiving, via at least one processor, image data from at least one camera of the vehicle;
   detecting, via the at least one processor, a 2D measurement location of a static object in an image plane of the camera using the image data;
   receiving, via the at least one processor, an input vector determined in response to a steering angle detected by a steering angle sensor of the vehicle, a wheel speed detected by a wheel speed sensor of the vehicle and an acceleration measured by an inertial measurement unit of the vehicle;
   predicting, via the at least one processor, a predicted 3D location of the static object using an Unscented Kalman Filter (UKF) that incorporates a motion model for the vehicle and further using the 2D measurement location of the static object, and the input vector wherein the predicting the 3D location of the static object using the UKF includes a prediction step and an update step, wherein the prediction step performs the following:
   constructing a prediction sigma point matrix,
   propagating the prediction sigma point matrix through the motion model to obtain propagated sigma points,
   determining an estimated 3D location of the static object using the propagated sigma points,
   estimating a propagated estimation error covariance using the propagated sigma point; and
   wherein the update step performs the following:
   constructing an update sigma point matrix using the estimated 3D location of the static object and the propagated estimation error covariance,
   propagating the update sigma point matrix through a measurement model to obtain a measurement sigma point matrix representing predicted 2D measurement locations of the static object in the image plane of the camera,
   determining an updated 3D location of the static object using a disparity between the measurement sigma point matrix and the 2D measurement location of the static object in the image plane of the camera;
   controlling, via the at least one processor, at least one vehicle feature based on the predicted 3D location of the static object, wherein the UKF is initialized based on a set of sigma points that are generated using a first detection of the 2D measurement location of the static object in the image plane and a range prior, and
   wherein the set of sigma points are used to generate a prior 3D location for an initialization of the UKF, and wherein a disparity between the first detection of the 2D location measurement and a predicted 2D state measurement is used to update the estimated 3D location of the static object such that an updated 3D state and an updated covariance are provided and wherein a subsequent iteration of the UKF is performed in response to the updated 3D state and the updated covariance.

2. The method of claim 1, wherein the range prior includes an average range value for a first 3D location of the static object relative to the vehicle.

3. The method of claim 1, wherein the range prior is determined based on an average range in which the static object is initially detected, an estimate of an average range of the static object based on a size of a bounding box provided from the detecting of the 2D measurement location of the static object, an association with other tracked static objects of the same kind and an area of the 2D measurement location of the static object, or a detection of the static object using 3D perception modalities.

4. The method of claim 1, comprising recursively updating the predicted 3D location of the static object using new detections of the 2D measurement location of the static object in the image plane and a prior prediction of the 3D location of the static object using the UKF.

5. The method of claim 1, wherein the static object is a Traffic Control Device (TCD).

6. The method of claim 1, wherein a path of the vehicle is determined in response to the predicted 3D location of the static object and wherein the at least one vehicle feature includes a steering control, a propulsion control and a braking control.

7. The method of claim 1, comprising assigning a lane to a TCD and controlling the at least one vehicle feature is responsive to a state of the TCD when the TCD is assigned to a same lane as that of the vehicle.

8. The method of claim 1, wherein the input vector includes a value of angular velocity of the vehicle and a value of linear velocity of the vehicle.

9. The method of claim 1, wherein the UKF uses the motion model and a measurement model to predict a predicted 2D location of the static object in the image plane and predicts the predicted 3D location of the static object based on a disparity between the predicted 2D location of the static object and the measurement 2D location of the static object.

10. A system for controlling a vehicle, the system comprising:
    at least one camera;
    a sensor system;

at least one processor in operable communication with the sensor system and the at least one camera, wherein the at least one processor is configured to execute program instructions, wherein the program instructions are configured to cause the at least one processor to:

receive image data from the at least one camera of the vehicle;

detect a 2D measurement location of a static object in an image plane of the camera using the image data;

receive an input vector of measurements from the sensor system of the vehicle wherein the input vector is determined in response to a steering angle detected by a steering angle sensor of the vehicle, a wheel speed detected by a wheel speed sensor of the vehicle and an acceleration measured by an inertial measurement unit;

predict a predicted 3D location of the static object using a Unscented Kalman Filter (UKF) that incorporates a motion model for the vehicle and further using the 2D measurement location of the static object, and the input vector wherein the program instructions are configured to cause the at least one processor to predict the 3D location of the static object using the UKF using a prediction step and an update step, wherein the prediction step performs the following:

constructing a prediction sigma point matrix, propagating the prediction sigma point matrix through the motion model to obtain propagated sigma points, determining an estimated 3D location of the static object using the propagated sigma points, estimating a propagated estimation error covariance using the propagated sigma point:

constructing an update sigma point matrix using the estimated 3D location of the static object and the propagated estimation error covariance, propagating the update sigma point matrix through a measurement model to obtain a measurement sigma point matrix representing predicted 2D measurement locations of the static object in the image plane of the camera, determining an updated 3D location of the static object using a disparity between the measurement sigma point matrix and the 2D measurement location of the static object in the image plane of the camera;

control at least one vehicle feature based on the predicted 3D location of the static object, initialize the UKF based on a set of sigma points that are generated using a first detection of the 2D measurement location of the static object in the image plane and a range prior, and wherein the set of sigma points are used to generate a prior 3D location for an initialization of the UKF, and wherein a disparity between the first detection of the 2D location measurement and a predicted 2D state measurement is used to update the estimated 3D location of the static object such that an updated 3D state and an updated covariance are provided and wherein a subsequent iteration of the UKF is performed in response to the updated 3D state and the updated covariance.

11. The system of claim 10, wherein the range prior includes an average range value for a first 3D location of the static object relative to the vehicle.

12. The system of claim 10, wherein the range prior is determined based on an average range in which the static object is initially detected, an estimate of an average range of the static object based on a size of a bounding box provided from the detecting of the 2D measurement location of the static object, an association with other tracked static objects of the same kind and an area of the 2D measurement location of the static object, or a detection of the static object using 3D perception modalities.

13. The system of claim 10, wherein the program instructions are configured to cause the at least one processor to recursively update the predicted 3D location of the static object using new detections of the 2D measurement location of the static object in the image plane and a prior prediction of the 3D location of the static object using the UKF.

14. The system of claim 10, wherein the static object is a Traffic Control Device (TCD).

15. The system of claim 10, wherein a path of the vehicle is determined in response to the predicted 3D location of the static object and wherein the at least one vehicle feature includes a steering control, a propulsion control and a braking control.

16. The system of claim 10, wherein the program instructions are configured to cause the at least one processor to assign a lane to the TCD, wherein controlling the at least one vehicle feature is responsive to a state of the TCD when the TCD is assigned to a same lane as that of the vehicle.

17. A vehicle, comprising:
at least one camera;
a sensor system;
at least one processor in operable communication with the sensor system and the at least one camera, wherein the at least one processor is configured to execute program instructions, wherein the program instructions are configured to cause the at least one processor to:

receive image data from the at least one camera of the vehicle;

detect a 2D measurement location of a static object in an image plane of the at least one camera using the image data;

receive an input vector of measurements from the sensor system of the vehicle, wherein the input vector is determined in response to a steering angle detected by a steering angle sensor of the vehicle, a wheel speed detected by a wheel speed sensor of the vehicle and an acceleration measured by an inertial measurement unit;

predict a predicted 3D location of the static object using a Unscented Kalman Filter (UKF) that incorporates a motion model for the vehicle and further using the 2D measurement location of the static object, and the input vector wherein the program instructions are configured to cause the at least one processor to predict the 3D location of the static object using the UKF using a prediction step and an update step, wherein the prediction step performs the following:

constructing a prediction sigma point matrix, propagating the prediction sigma point matrix through the motion model to obtain propagated sigma points, determining an estimated 3D location of the static object using the propagated sigma points, estimating a propagated estimation error covariance using the propagated sigma point:

constructing an update sigma point matrix using the estimated 3D location of the static object and the propagated estimation error covariance, propagating the update sigma point matrix through a measurement model to obtain a measurement sigma point matrix representing predicted 2D measurement locations of the static object in the image plane of the camera, determining an updated 3D location of the static object using a disparity between the measurement sigma point matrix and the 2D measurement location of the static object in the image plane of the camera;

control at least one vehicle feature based on the predicted 3D location of the static object, initialize the UKF based on a set of sigma points that are generated using a first detection of the 2D measurement location of the static object in the image plane and a range prior, and wherein the set of sigma points are used to generate a prior 3D location for an initialization of the UKF, and wherein a disparity between the first detection of the 2D location measurement and a predicted 2D state measurement is used to update the estimated 3D location of the static object such that an updated 3D state and an updated covariance are provided and wherein a subsequent iteration of the UKF is performed in response to the updated 3D state and the updated covariance.

* * * * *